(12) United States Patent
Matsumoto

(10) Patent No.: US 8,605,468 B2
(45) Date of Patent: Dec. 10, 2013

(54) SWITCHING POWER SUPPLY AND IMAGE FORMING APPARATUS WITH EMF REDUCTION OF THE CURRENT SENSE CIRCUIT

(75) Inventor: Shinichiro Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/360,552

(22) Filed: Jan. 27, 2012

(65) Prior Publication Data
US 2012/0195620 A1    Aug. 2, 2012

(30) Foreign Application Priority Data
Feb. 1, 2011    (JP) ................................. 2011-020140

(51) Int. Cl.
*H02M 3/335*    (2006.01)

(52) U.S. Cl.
USPC .................. 363/21.12; 363/21.15; 363/21.16; 363/21.17; 363/21.18

(58) Field of Classification Search
USPC ........... 363/21.12, 21.15, 21.16, 21.17, 21.18
See application file for complete search history.

(56) References Cited

U.S. PATENT DOCUMENTS

| 5,874,841 | A  | * | 2/1999  | Majid et al. | 327/94 |
| 6,292,376 | B1 | * | 9/2001  | Kato | 363/21.09 |
| 7,161,783 | B2 |   | 1/2007  | Yoshida | |
| 7,898,823 | B2 | * | 3/2011  | Wu | 363/21.12 |
| 8,120,931 | B2 | * | 2/2012  | Chang et al. | 363/21.07 |
| 8,144,486 | B2 | * | 3/2012  | Moon et al. | 363/21.12 |
| 8,144,487 | B2 | * | 3/2012  | Djenguerian et al. | 363/21.12 |
| 8,149,601 | B2 | * | 4/2012  | Xiaowu et al. | 363/21.12 |
| 8,164,926 | B2 | * | 4/2012  | Schroeder genannt Berghegger | 363/21.12 |
| 8,194,425 | B2 | * | 6/2012  | Park et al. | 363/21.18 |
| 8,199,537 | B2 | * | 6/2012  | Yan et al. | 363/21.12 |
| 8,284,578 | B2 | * | 10/2012 | Samejima | 363/79 |
| 8,300,431 | B2 | * | 10/2012 | Ng et al. | 363/21.12 |

FOREIGN PATENT DOCUMENTS

JP    2004-312901 A    11/2004

* cited by examiner

*Primary Examiner* — Bao Q Vu
(74) *Attorney, Agent, or Firm* — Canon U.S.A., Inc., IP Division

(57) ABSTRACT

In a switching power supply, a current detection resistor is connected to a switching unit to detect a current flowing through the switching unit. A diode is connected in parallel to the current detection resistor to reduce heat generated in the switching unit by back electromotive force generated by an inductance component of the current detection resistor.

12 Claims, 12 Drawing Sheets

SWITCHING POWER SUPPLY AND IMAGE FORMING APPARATUS WITH EMF REDUCTION OF THE CURRENT SENSE CIRCUIT

BACKGROUND OF THE INVENTION

1. Field of the Invention

The present invention relates to a switching power supply for supplying electric power to an electronic device.

2. Description of the Related Art

An example of a switching power supply is described below with reference to FIG. 8 and FIG. 9. In FIG. 8, a direct-current voltage Vin charged in a primary electrolytic capacitor C1 is supplied to a drain terminal of a field effect transistor FET1 serving as a switching element via a primary winding of a transformer T1. A source terminal of the field effect transistor FET1 is connected to a primary electrolytic capacitor C1 via a current detection resistor Ris. A secondary winding of the transformer T1 is connected to a secondary electrolytic capacitor C2 via a secondary rectifier diode D3. A direct-current voltage Vout stored across the secondary electrolytic capacitor C2 is output as an output voltage from the switching power supply. The direct-current voltage Vout is divided by a resistor R3 and a resistor R4, and a divided voltage is supplied to a reference terminal of a shunt regulator IC2. A cathode terminal of the shunt regulator IC2 is connected to an LED of a photocoupler PC-FB. A phototransistor of the photocoupler PC-FB is connected to a PWM control module IC1. A collector voltage of the phototransistor of the photocoupler PC-FB serves as a feedback signal (also referred to as a FB signal) of the output voltage Vout of the switching power supply. The FB signal is pulled up by a resistor R1 in the PWM control module IC1 and input to an inverting input terminal of a PWM amplifier AMP1. A non-inverting input terminal of the PWM amplifier AMP1 is supplied with a triangle wave signal (also referred to as an OSC signal) from a triangle wave signal generator.

Referring to FIG. 9, when the voltage of the OSC signal is higher than the voltage of the FB signal, as at time t0, the PWM amplifier AMP1 outputs a high-level (H-level) signal. The signal output from the PWM amplifier AMP1 is supplied to an input terminal of an OR circuit. The other input terminal of the OR circuit is supplied with a Q output from a flip-flop circuit FF. At time t0, the Q output of the flip-flop circuit FF is at a low level (also referred to as an L level) as explained later, and thus an output of the OR circuit is at a high level (also referred to as an H level). The output from the OR circuit is supplied to an output buffer circuit including a field effect transistor FET2 which is a P-channel MOSFET serving as a switching element and a field effect transistor FET3 which is an N-channel MOSFET also serving as a switching element. Thus, an output signal (also referred to as an OUT signal) from the PWM control module IC1 is at an L level. The OUT signal is supplied to a gate terminal of the field effect transistor FET1. Thus, the field effect transistor FET1 turns off.

At time t1, if the voltage of the OSC signal becomes lower than the voltage of the FB signal, the output of the PWM amplifier AMP1 goes to the L level, the output of the OR circuit goes to the L level, and the OUT signal goes to the H level. Thus the field effect transistor FET1 turns on and a drain current Id flows through the field effect transistor FET1. At time t2, if the voltage of the OSC signal again becomes higher than the voltage of the FB signal, the output of the PWM amplifier AMP1 goes to the H level, the output of the OR circuit goes to the H level, and the OUT signal goes to the L level. Thus the field effect transistor FET1 turns off, and the flowing of the drain current Id stops.

Then at time t3 and in a following period, the output current Iout of the switching power supply increases and the output voltage Vout falls down slightly. In response, the shunt regulator IC2 reduces the current flowing through the LED of the photocoupler PC-FB. As a result, the FB signal increases and the length of the ON period (also referred to as an ON pulse width) from t4 to t5 of the field effect transistor FET1 increases. As a result, the output voltage Vout increases slightly.

The PWM control module IC1 controls the ON period of the field effect transistor FET1 (by the PWM control) to stabilize the output voltage Vout in the above-described manner.

The switching power supply of the above-described type usually has an overload protection circuit. More specifically, the overload protection circuit operates such that the drain current Id of the field effect transistor FET1 is detected by the current detection resistor Ris connected to the source terminal of the field effect transistor FET1, and if the drain current Id becomes equal to a predetermined value and more specifically Vref/Ris, the field effect transistor FET1 is turned on whereby a load current of the switching power supply is limited to a predetermined rated value Ip or less.

The operation of the overload protection circuit is described in further detail below. The drain current Id of the field effect transistor FET1 is converted into a voltage by the current detection resistor Ris and supplied, as a current detection signal IS, to a non-inverting input terminal of a current sense amplifier AMP2 in the PWM control module IC1. An inverting input terminal of the current sense amplifier AMP2 is connected to a constant voltage source Vref. When the value of the drain current Id is less than Vref/Ris as in a period from t0 to t8, the voltage of the current detection signal IS is lower than Vref, and the output of the amplifier AMP2 is at the L level. The output of the amplifier AMP2 is supplied to an S input terminal of the flip-flop FF.

An R input terminal of the flip-flop FF is supplied with the OSC signal so that the flip-flop FF is reset when the OSC signal has a peak value. Thus, the flip-flop FF is reset at times t1, t4, t6, and t8 at which the OSC signal is at its peak. During this period, the S input terminal of the flip-flop FF is at the L level, and thus the Q output of the flip-flop FF is at the H level. The Q output of the flip-flop FF is supplied to the OR circuit. Thus, during the period from time t0 to time t8, the switching operation of the field effect transistor FET1 does not receive any influence. At time t9, if the value of the drain current Id reaches Vref/Ris, the voltage of the current detection signal IS becomes higher than Vref, and the output of the amplifier AMP2 goes to the H level. As a result, the Q terminal of the flip-flop FF goes to the H level, the output of the OR circuit goes to the H level, and the OUT signal goes to the L level, and thus the field effect transistor FET1 turns off. At time t10, the flip-flop FF is reset, and the field effect transistor FET1 again turns on. However, when the drain current Id reaches Vref/Ris (at time t11), the field effect transistor FET1 turns off. As described above, the drain current Id is limited to the predetermined value equal to Vref/Ris. Therefore, the output current Iout of the switching power supply is also limited to a predetermined value Ip. A description of the above-described technique may be found, for example, in Japanese Patent Laid-Open No. 2004-312901.

The above-described switching power supply has a following problem.

The drain current Id of the field effect transistor FET1 has an intermittent triangular waveform. Therefore, the current flowing through the current detection resistor Ris also has an intermittent triangular waveform. In view of the above, usually, a resistor having high pulse resistance is used as the current detection resistor Ris. For example, a wire wound resistor formed by winding a metal wire into the form of a coil as shown in FIG. 10A a film resistor formed by cutting a helical slit in a cylindrical resistor film as shown in FIG. 10B.

By virtue of their coil structure, the resistors of these types have inductance Lis. The inductance Lis of the current detection resistor Ris influences the operation as described below with reference to FIGS. 11 and 12.

At time t21, if a gate-source voltage Vgs of the field effect transistor FET1 increases beyond a gate threshold voltage Vth, the drain current Id starts to flow and the value of the drain current Id gradually increases. The drain current Id also flows through the inductance Lis of the current detection resistor Ris. At time t22, if the gate-source voltage Vgs falls down below the gate threshold voltage Vth, the drain current Id abruptly decreases. This causes a back electromotive force Vs to occur across the inductance Lis. This back electromotive force Vs occurs such that the polarity thereof is negative at the source terminal of the field effect transistor FET1 and positive at the GND terminal of the PWM control module 101. The FET3 in the PWM control module 101 includes a body diode D1. Thus, the back electromotive force (back electromotive voltage) Vs is applied between the gate and the source of the field effect transistor FET1 through a path including a GND terminal of IC1→the body diode D1→the gate of the field effect transistor FET1, as indicated by a broken line in FIG. 11. In response, as indicated at time t23 in FIG. 12, the gate-source voltage Vgs of the field effect transistor FET1 increases beyond the threshold voltage Vth, which causes the field effect transistor FET1 to again turn on. As a result, the drain current Id starts to flow. In this state, the drain-source voltage Vds of the field effect transistor FET1 has a very high value, which may cause heat to be generated in the field effect transistor FET1. In the worst case, the field effect transistor FET1 is destroyed.

In view of the above-described problem, the present invention provides a technique to reduce heat generated in a switching element caused by back electromotive force generated by inductance of a current detection resistor.

SUMMARY OF THE INVENTION

In an aspect, the present invention provides a switching power supply including a switching unit configured to drive a primary winding of a transformer, a current detection unit connected to the switching unit and configured to detect a current flowing through the switching unit, and an electromotive force reduction unit connected in parallel to the current detection unit and configured to reduce an electromotive force generated by inductance of the current detection unit.

Further features of the present invention will become apparent from the following description of exemplary embodiments with reference to the attached drawings.

DESCRIPTION OF THE EMBODIMENTS

The present invention is described in further detail below with reference to embodiments in conjunction with the accompanying drawings. More specifically, a structure of a switching power supply and an operation thereof according to embodiments of the present invention are described below. Note that these embodiments are provided by way of example but not limitation.

Figure 1:
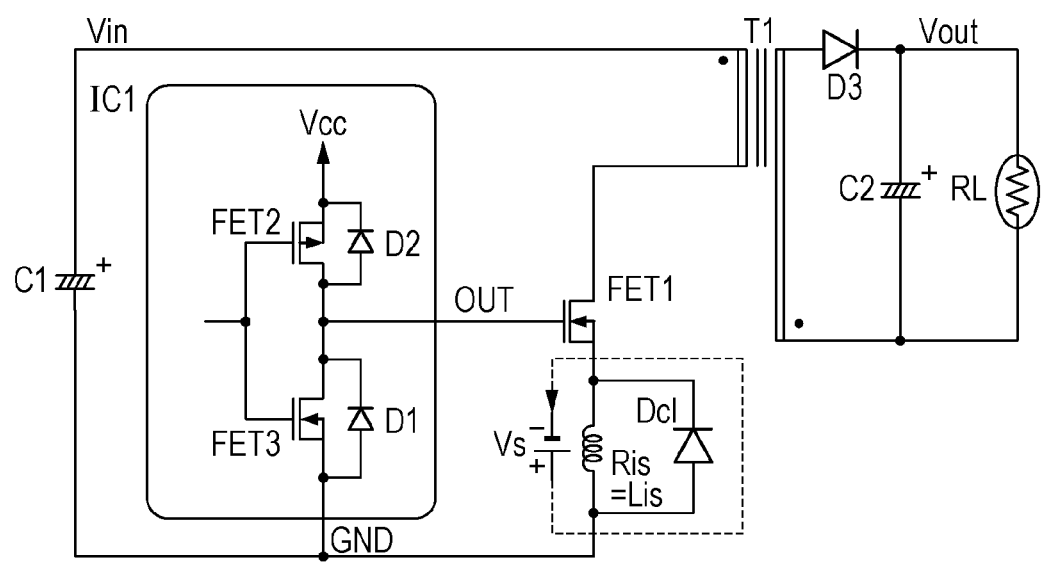
FIG. 1 is a circuit diagram of a switching power supply according to a first embodiment of the invention.
Figure 2:
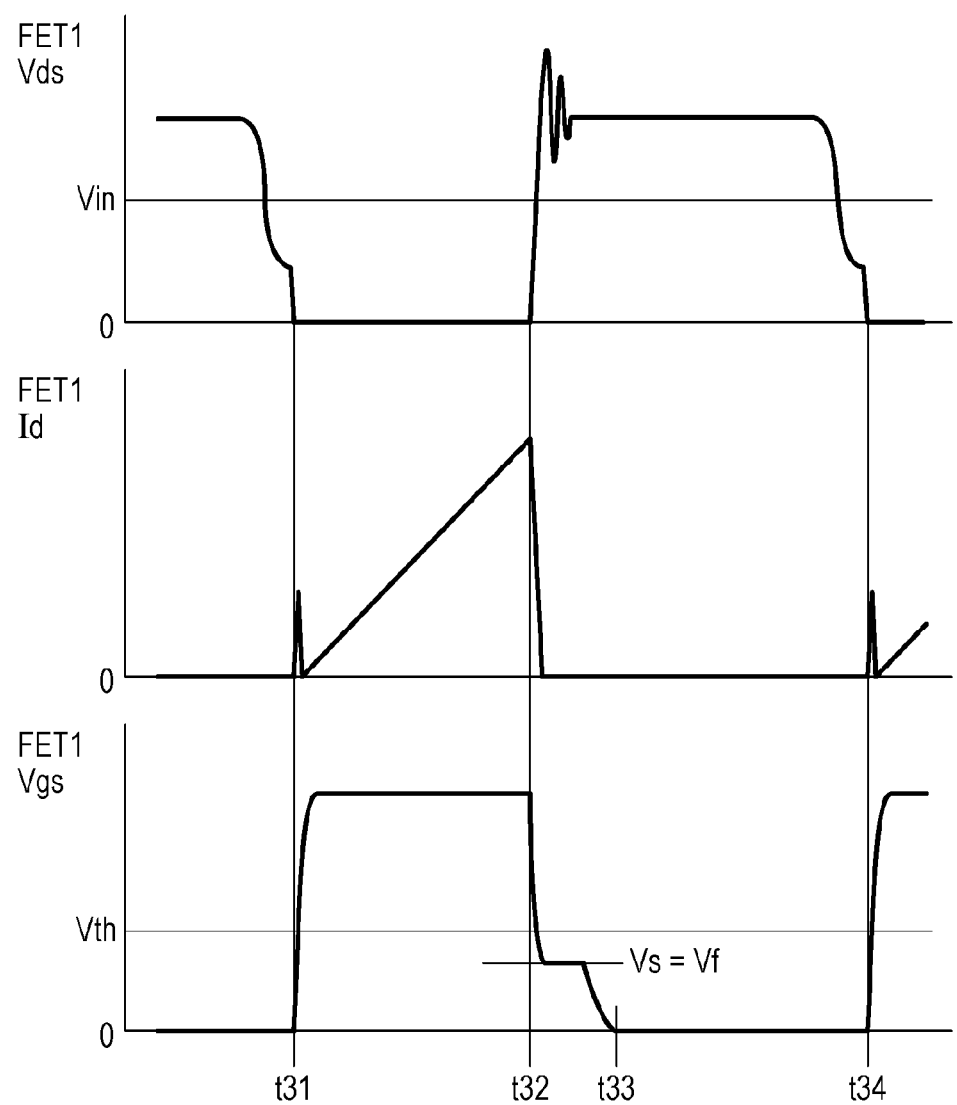
FIG. 2 is a diagram illustrating operation waveforms associated with the circuit according to the first embodiment of the invention.
Figure 10A:
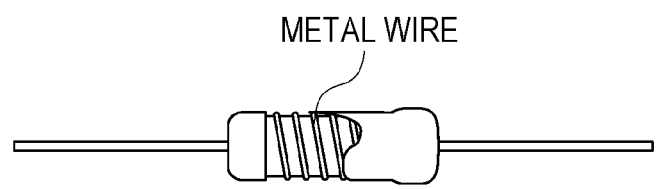
FIGS. 10A and 10B are diagrams illustrating structures of current detection resistors.
Figure 10B:
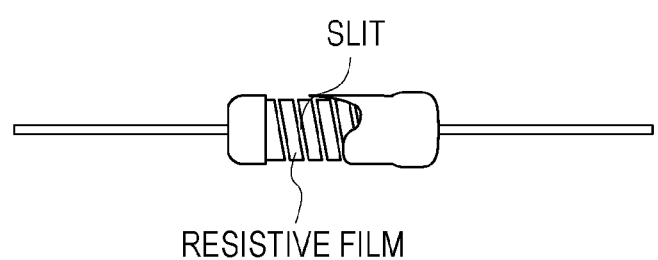
Figure 11:
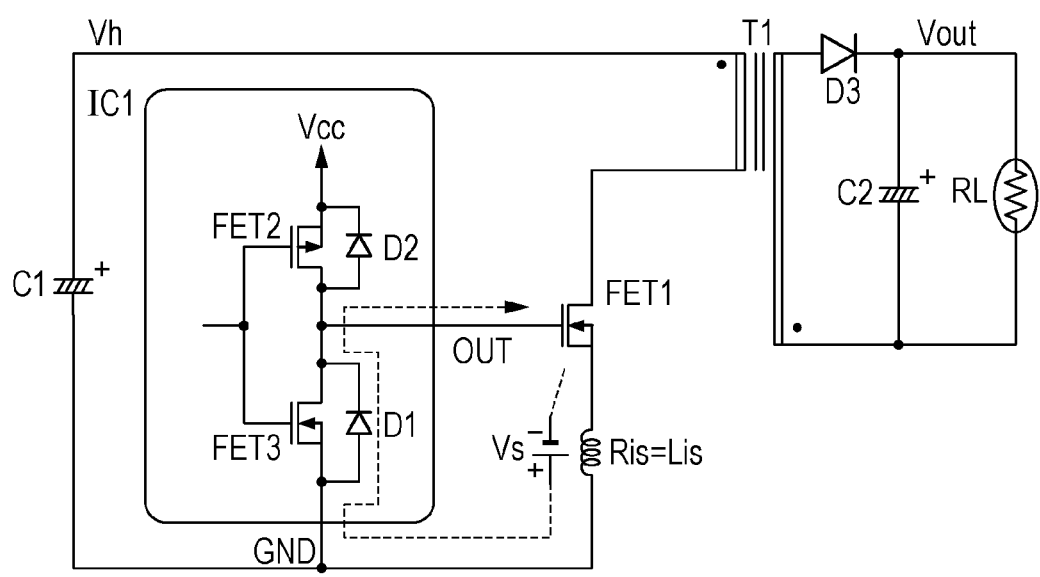
FIG. 11 illustrates an example of a circuit of a switching power supply.
Figure 12:
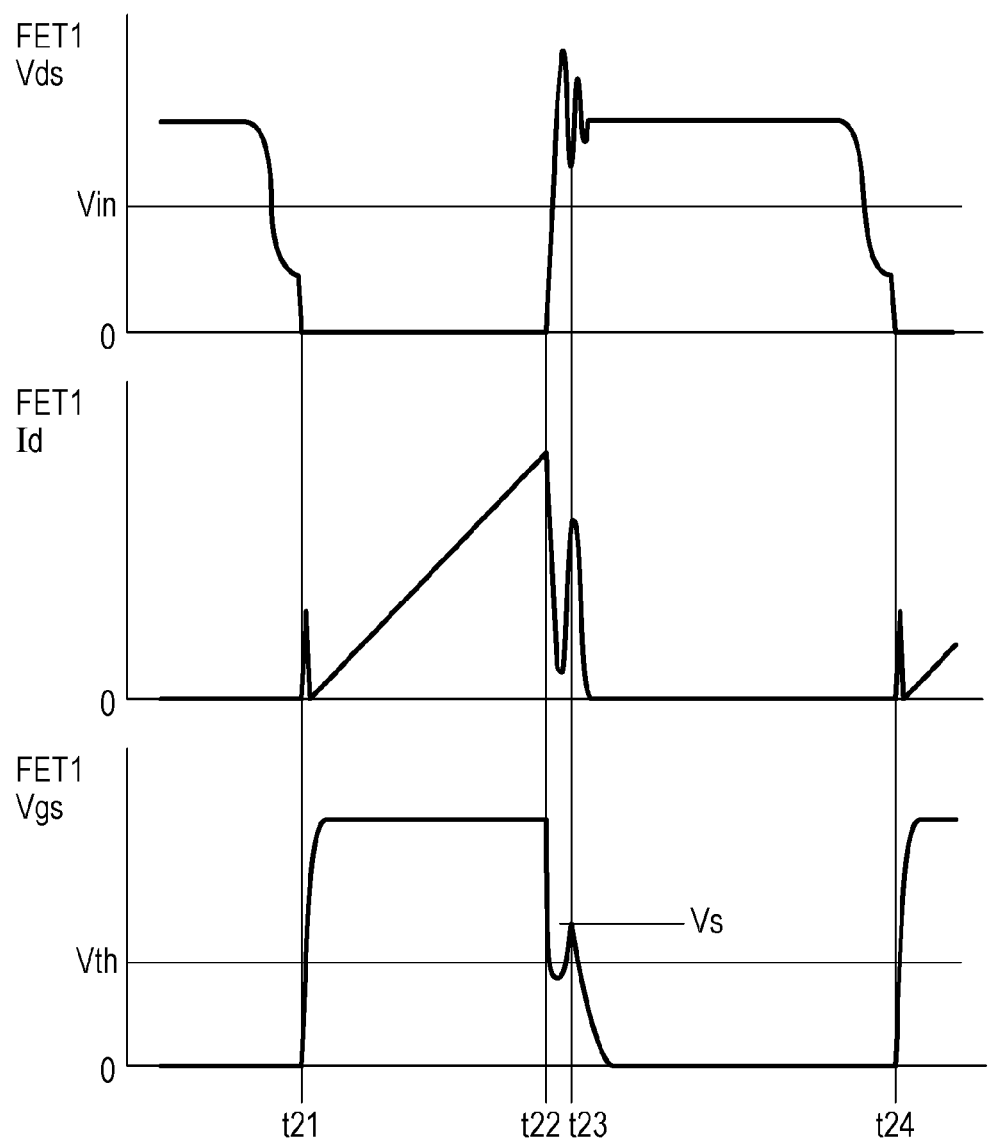
FIG. 12 illustrates operation waveforms associated with the circuit shown in FIG. 11.

Referring to FIG. 1 and FIG. 2, a switching power supply according to a first embodiment of the invention is described below. In the first embodiment, a diode Dcl is connected in parallel to a current detection resistor Ris so that a back electromotive force (back electromotive voltage) generated by inductance Lis of the current detection resistor is clamped by a forward voltage Vf of the diode Dcl thereby to prevent a field effect transistor FET1 from turning on again. That is, the diode Dcl functions as an electromotive force reduction circuit. Note that the current detection resistor may be a wire wound resistor formed by winding a metal wire into the form of a coil or a film resistor formed by cutting a helical slit in a cylindrical resistor film (see FIGS. 10A and 10B).

Figure 8:
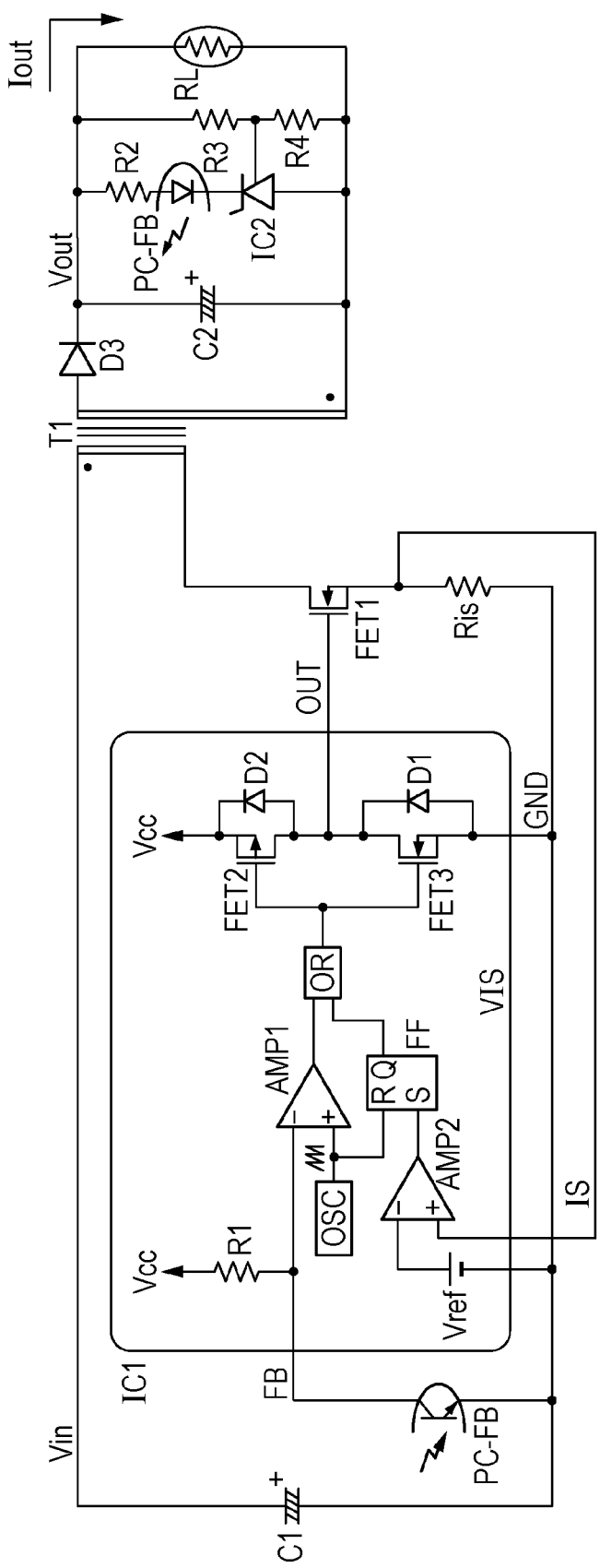
FIG. 8 is a diagram illustrating a switching power supply.
Figure 9:
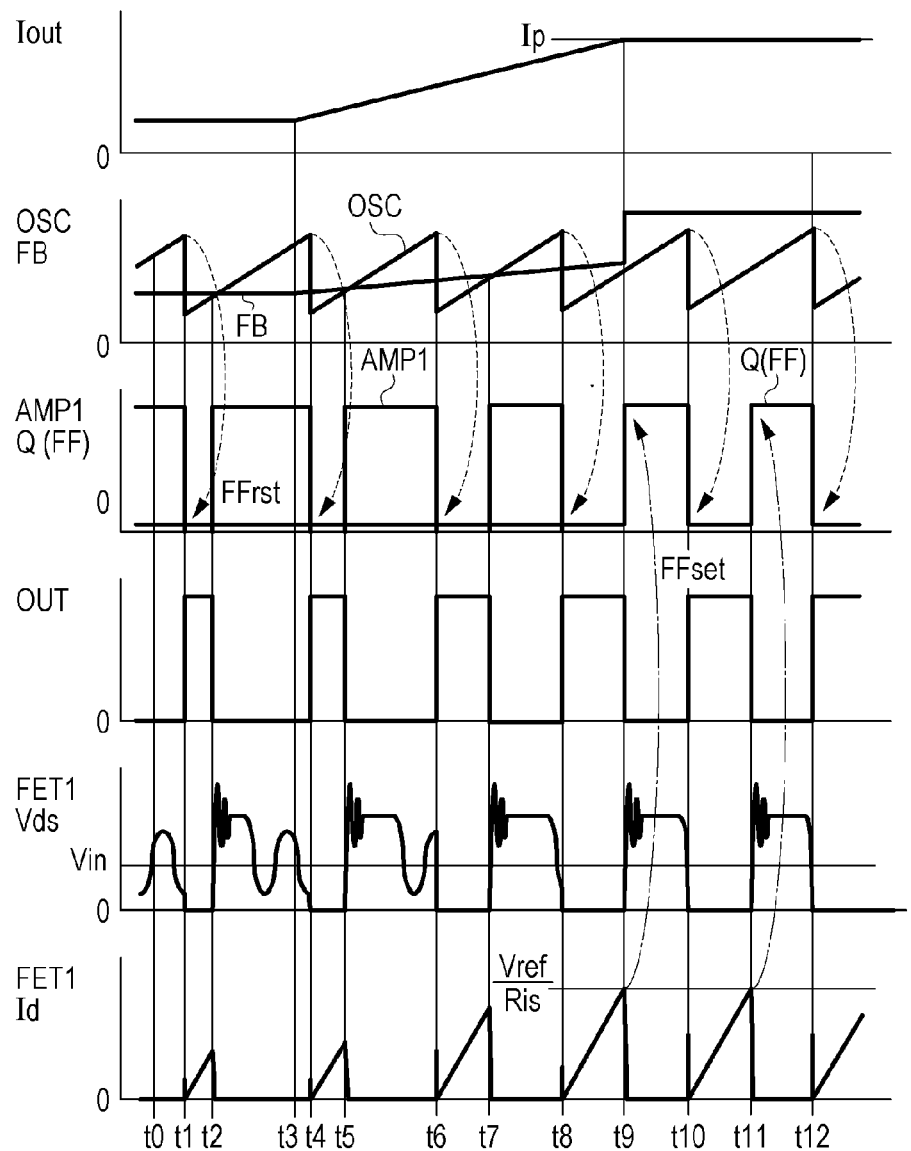
FIG. 9 is a diagram illustrating operation waveforms associated with the circuit shown in FIG. 8.

FIG. 1 illustrates a main part of the switching power supply according to the first embodiment. This main part of the switching power supply is configured in a similar manner to that shown in FIG. 8 in that a primary winding of a transformer is driven by a switching element at a predetermined frequency such that a voltage is output from a secondary winding of the transformer. In FIG. 1, similar elements to those in FIG. 8 are denoted by similar reference numerals. However, the switching power supply shown in FIG. 1 is different from that shown in FIG. 8 in that it additionally includes the diode Dcl.

FIG. 2 illustrates operation waveforms of the drain-source voltage, the drain current, and the gate-source voltage of the field effect transistor FET1 serving as a switching element according to the first embodiment. At time t31 in FIG. 2, if the gate-source voltage Vgs of the field effect transistor FET1 increases beyond a gate threshold voltage Vth, the drain current Id starts to flow and the value of the drain current Id gradually increases.

This drain current Id also flows through the inductance Lis of the current detection resistor Ris. At time t32, if the drain-source voltage Vgs falls down below the gate threshold voltage Vth, the drain current Id abruptly decreases. This causes a back electromotive force Vs to occur across the inductance Lis. This back electromotive force Vs occurs such that the polarity thereof is negative at the source terminal of the field effect transistor FET1 and positive at the GND terminal of the PWM control module 101.

In the present embodiment, the diode Dcl is connected in parallel to the current detection resistor Ris. In this state, a forward voltage drop Vf of the diode Dcl is smaller than the gate threshold voltage Vth of the field effect transistor FET1. Therefore, the generated back electromotive force Vs is clamped by the forward voltage drop Vf of the diode Dcl as indicated by a broken line in FIG. 1. That is, during a period from time t32 to time t34, the gate-source voltage Vgs of the field effect transistor FET1 is also clamped by Vf of the diode Dcl, and thus the gate-source voltage Vgs of the field effect transistor FET1 does not become greater than the threshold voltage Vth.

In the present embodiment, as described above, the diode is connected in parallel to the current detection resistor (wire wound resistor) and the forward voltage drop of the diode is set to be smaller than the gate threshold voltage Vth of the field effect transistor FET1. This prevents the field effect transistor FET1 from being turned on again by the back electromotive force of the current detection resistor and thus prevents the drain current Id from starting to flow through the field effect transistor FET1. Thus, a reduction in heat generated in the field effect transistor FET1 is achieved. The reduction in heat generated in the field effect transistor FET1 leads to a reduction in occurrence of a failure such as destruction caused by heat generation.

Next, referring to FIG. 3 and FIG. 4, a structure of a switching power supply and an operation thereof according to a second embodiment are described below. In this embodiment, a capacitor Ccl is connected in parallel to the current detection resistor Ris thereby to reduce back electromotive force Vs generated by inductance Lis of the current detection resistor so that the field effect transistor FET1 is prevented from being turned on again. That is, the capacitor Ccl functions as an electromotive force reduction circuit. The current detection resistor may be a wire wound resistor formed by winding a metal wire into the form of a coil or a film resistor formed by cutting a helical slit in a cylindrical resistor film (see FIGS. 10A and 10B).

Figure 3:
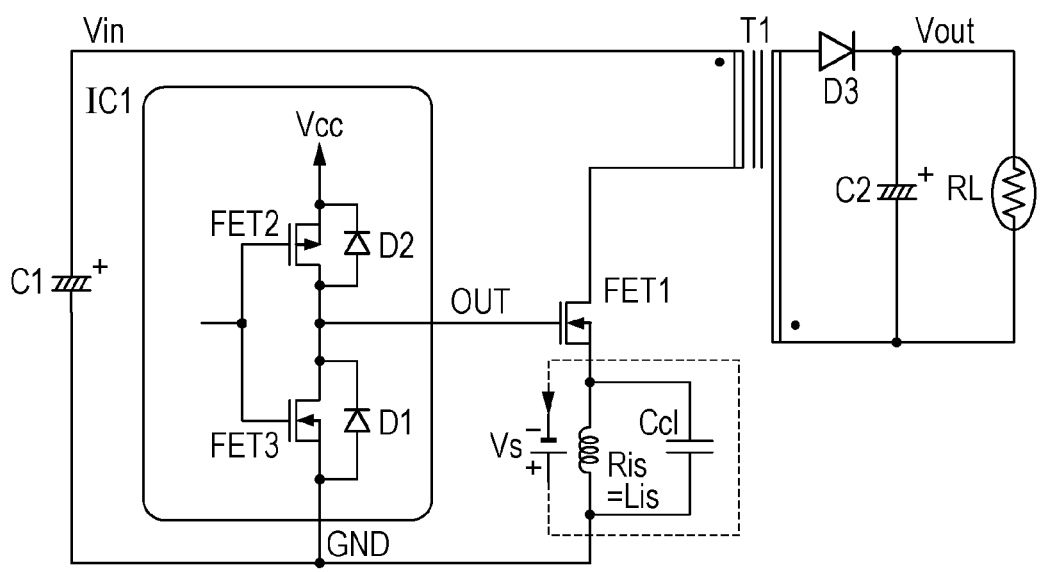
FIG. 3 is a circuit diagram of a switching power supply according to a second embodiment of the invention.

FIG. 3 illustrates a main part of the switching power supply according to the second embodiment. This main part of the switching power supply is configured in a similar manner to that shown in FIG. 8 in that a primary winding of a transformer is driven by a switching element at a predetermined frequency such that a voltage is output from a secondary winding of the transformer. In FIG. 3, similar elements to those in FIG. 8 are denoted by similar reference numerals. However, the switching power supply shown in FIG. 3 is different from that shown in FIG. 8 in that it additionally includes the capacitor Ccl.

Figure 4:
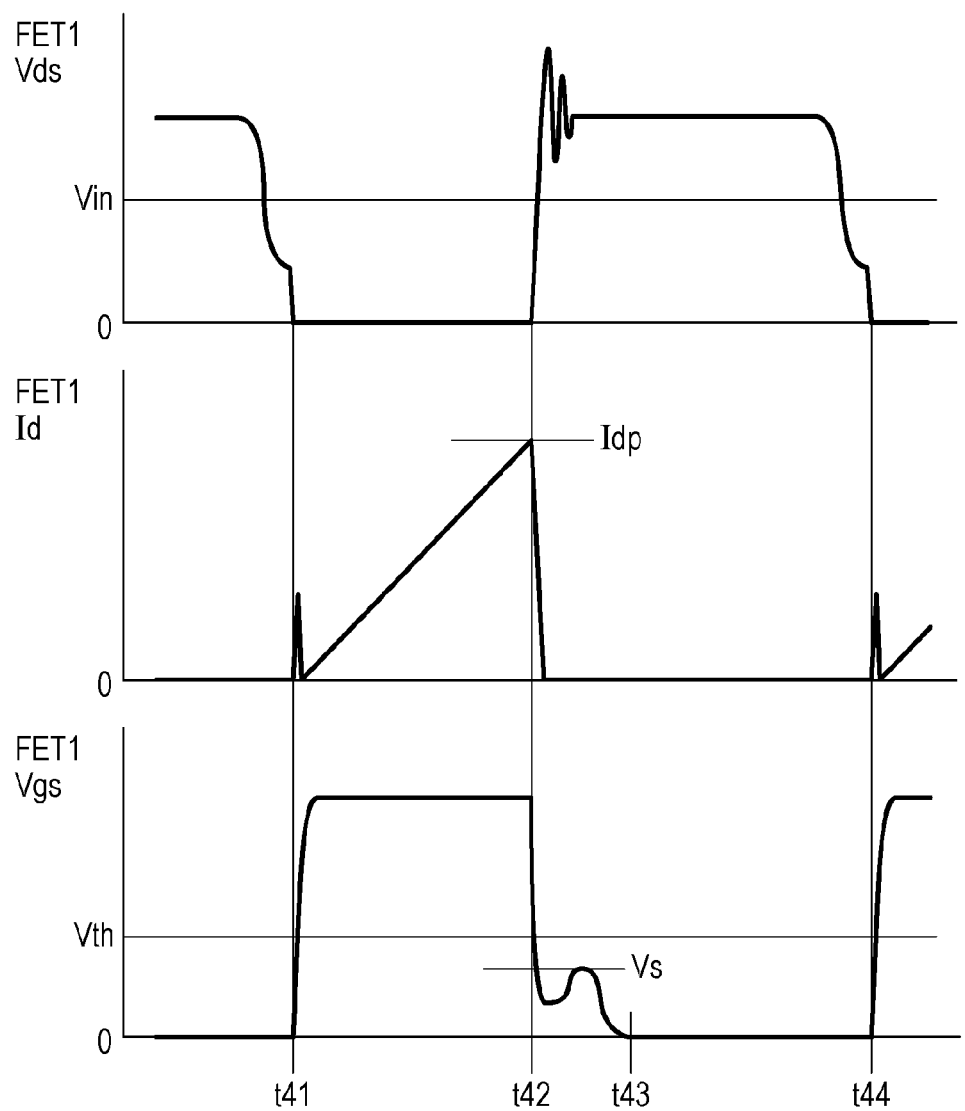
FIG. 4 is a diagram illustrating operation waveforms associated with the circuit according to the second embodiment of the invention.

FIG. 4 illustrates operation waveforms of the drain-source voltage, the drain current, and the gate-source voltage of the field effect transistor FET1 serving as a switching element according to the second embodiment. At time t41, if the gate-source voltage Vgs of the field effect transistor FET1 increases beyond the gate threshold voltage Vth, the drain current Id starts to flow and the value of the drain current Id gradually increases. This drain current Id also flows through the inductance Lis of the current detection resistor Ris. At time t42, if the gate-source voltage Vgs falls down below the gate threshold voltage Vth, the drain current Id abruptly falls down. This causes a back electromotive force Vs to occur across the inductance Lis of the current detection resistor Ris. This back electromotive force Vs occurs such that the polarity thereof is negative at the source terminal of the field effect transistor FET1 and positive at the GND terminal of the PWM control module IC1.

In this second embodiment, the capacitor Ccl is connected in parallel to the current detection resistor Ris. Energy stored in the capacitor Ccl by the back electromotive force Vs generated in the inductance Lis is equal to energy stored in the inductance Lis by the drain current Idp flowing through the inductance Lis in an immediately previous state. That is, a following equation (1) substantially holds.

$$\tfrac{1}{2} \cdot C_{cl} \cdot V_s^2 \cong \tfrac{1}{2} \cdot L_{is} \cdot I_{dp}^2 \qquad (1)$$

By solving equation (1) with respect to Vs, a following equation (2) indicating Vs is obtained.

$$V_s \cong \sqrt{\frac{L_{is}}{C_{cl}}} \cdot I_{dp} \qquad (2)$$

During a period from time t42 to time t43, the gate-source voltage Vgs of the field effect transistor FET1 increases until it reaches Vs described by equation (2). Note that in the present embodiment, the capacitance of the capacitor Ccl is set such that equation (3) described below is satisfied.

$$V_s \cong \sqrt{\frac{L_{is}}{C_{cl}}} \cdot I_{dp} \ll V_{th} \qquad (3)$$

By setting the capacitance of the capacitor Ccl in the manner described above, it is ensured that Vs does not exceed the gate threshold voltage Vth.

In the present embodiment, as described above, the diode is connected in parallel to the current detection resistor (wire wound resistor) and the forward voltage drop of the diode is set to be smaller than the gate threshold voltage Vth of the field effect transistor FET1. This prevents the field effect transistor FET1 from being turned on again by the back electromotive force of the current detection resistor and thus prevents the drain current Id from starting to flow through the field effect transistor FET1. Thus, a reduction in heat generated in the field effect transistor FET1 is achieved. The reduction in heat generated in the field effect transistor FET1 leads to a reduction in occurrence of a failure such as destruction caused by heat generation.

Figure 5:
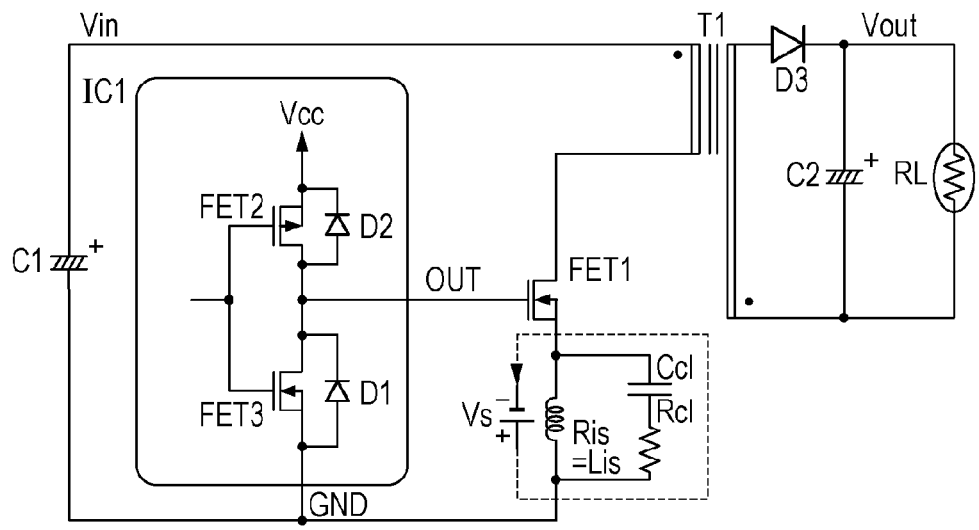
FIG. 5 is a circuit diagram of a switching power supply according to an alternative embodiment modified from the second embodiment of the invention.

In an alternative embodiment modified from the second embodiment, as shown in FIG. 5, a resistor Rcl may be connected in series to the capacitor Ccl to achieve similar effects to those obtained in the second embodiment. In this configuration, the voltage across the series connection of the capacitor Ccl and the resistor Rcl is set to be lower than the threshold voltage Vth.

Figure 6:
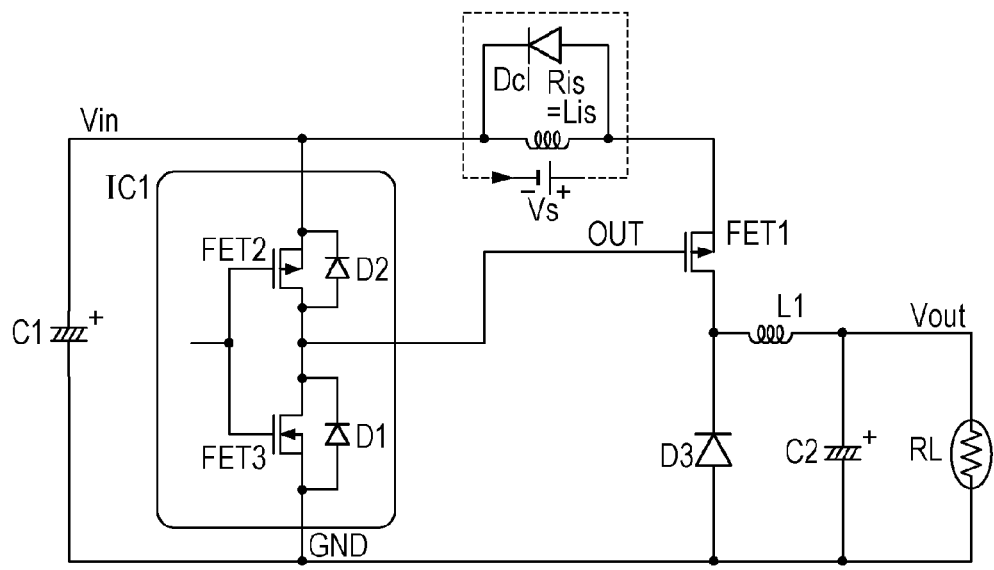
FIG. 6 is a circuit diagram of a switching power supply according to a third embodiment of the invention.

Next, referring to FIG. 6 and FIG. 7, a structure of a switching power supply and an operation thereof according to a third embodiment are described below. In this third embodiment, the invention is applied to a DC-DC converter. As in the first embodiment, a diode Dcl is connected in parallel to a current detection resistor Ris so that a back electromotive force (back electromotive voltage) generated by inductance Lis of the current detection resistor is clamped by a forward voltage drop Vf of the diode Dcl thereby to prevent the field effect transistor FET1 from turning on again. The current detection resistor may be a wire wound resistor formed by winding a metal wire into the form of a coil or a film resistor formed by cutting a helical slit in a cylindrical resistor film (see FIGS. 10A and 10B).

First, referring to FIG. 6, a circuit configuration of the DC-DC converter is described below. In FIG. 6, elements similar to those in the circuit on the primary side of the transformer shown in FIG. 8 are denoted by similar reference numerals or are not shown. In FIG. 6, a direct-current voltage Vin charged in a primary electrolytic capacitor C1 is supplied to a source terminal of the field effect transistor FET1 via the current detection resistor Ris. The voltage Vin input to the field effect transistor FET1 is switched by the field effect transistor FET1 to generate a pulse voltage, and the resultant generated pulse voltage is output from a drain terminal of the field effect transistor FET1.

The pulse voltage generated by the field effect transistor FET1 is smoothed by a diode D3, an inductor L1, and a secondary electrolytic capacitor C2, and supplied as an output voltage Vout to a load resistor RL. A gate terminal of the field effect transistor FET1 is supplied with an OUT signal from a PWM control module IC1. The PWM control module IC1 controls the switching operation of the field effect transistor FET1 by using a PWM signal such that the output voltage Vout is stabilized. The circuit configuration of the DC-DC converter according to the present embodiment has been described above.

Figure 7:
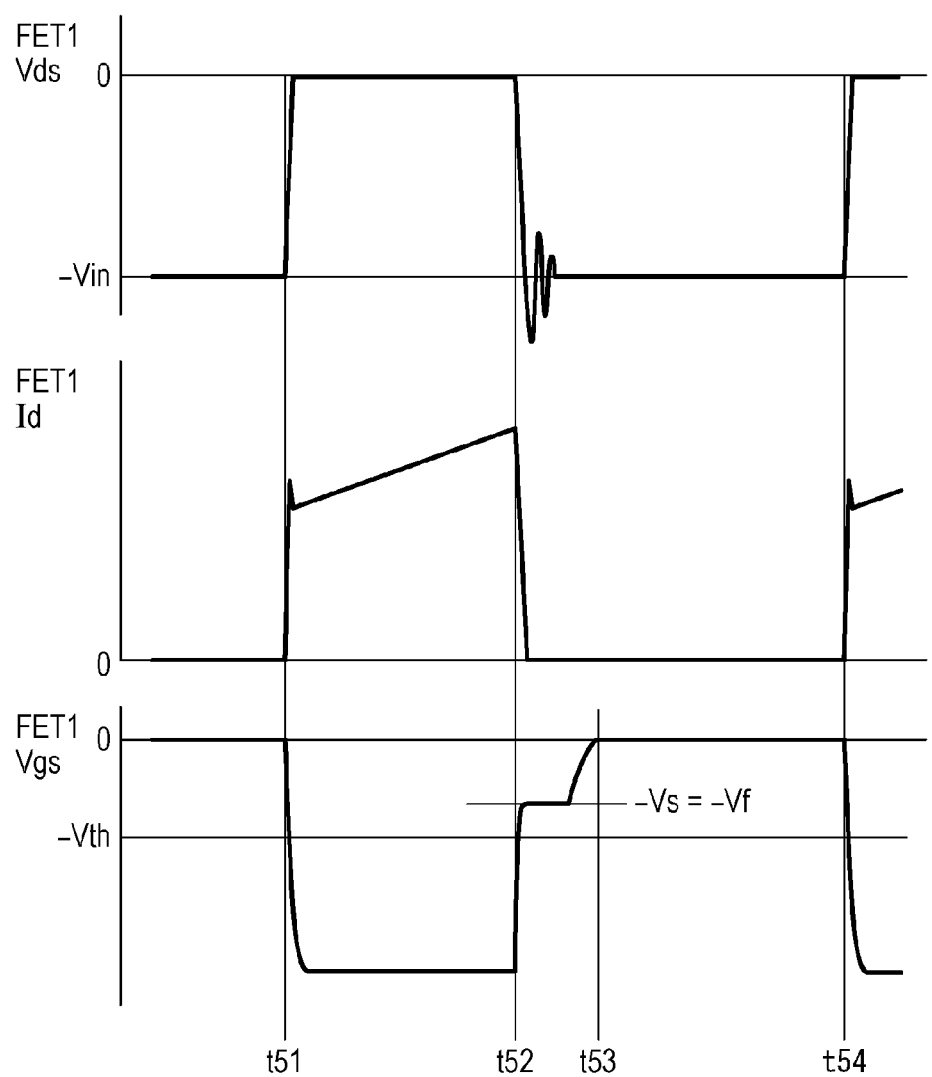
FIG. 7 is a diagram illustrating operation waveforms associated with the circuit according to the third embodiment of the invention.

Next, operation waveforms associated with the above-described circuit are discussed referring to FIG. 7. At time t51, if the gate-source voltage Vgs of the field effect transistor FET1 falls down below the gate threshold voltage Vth, the drain current Id flows through the field effect transistor FET1. This drain current Id also flows through the inductance Lis of the current detection resistor Ris. At time t52, if the gate-source voltage Vgs increases beyond the gate threshold voltage Vth, the drain current Id abruptly falls down. This causes a back electromotive force Vs to occur across the inductance Lis of the current detection resistor Ris. This back electromotive force Vs occurs such that the polarity thereof is negative at the input voltage Vin and positive at the source terminal of the field effect transistor FET1.

In the present embodiment, the diode Dcl is connected in parallel to the current detection resistor Ris. In this state, the forward voltage drop Vf of the diode Dcl is smaller than the gate threshold voltage Vth of the field effect transistor FET1. The back electromotive force Vs is clamped by the forward voltage drop Vf of the diode Dcl as indicated by a broken line in FIG. 6. Thus, during a period from time t52 to time t53, the gate-source voltage Vgs of the field effect transistor FET1 is also clamped by the voltage drop Vf of the diode Dcl, and thus the gate-source voltage Vgs of the field effect transistor FET1 does not become lower than the gate threshold voltage Vth.

In the present embodiment, as described above, the diode is connected in parallel to the current detection resistor (wire wound resistor) and the forward voltage drop of the diode is set to be smaller than the gate threshold voltage Vth of the field effect transistor FET1. This prevents the field effect transistor FET1 from being turned on again by the back electromotive force of the current detection resistor and thus prevents the drain current Id from starting to flow through the field effect transistor FET1. Thus, a reduction in heat generated in the field effect transistor FET1 is achieved. The reduction in heat generated in the field effect transistor FET1 leads to a reduction in occurrence of a failure such as destruction caused by heat generation.

Next, applications of the switching power supply are described below.

The switching power supply according to one of the embodiments described above may be used as a low-voltage power supply in an image forming apparatus such as a laser beam printer, a copying machine, a facsimile machine, or the like. Specific examples of such applications are described below. The switching power supply is used to supply electric power to a controller (control unit) of the image forming apparatus or a motor serving as a driving unit for driving a conveying roller to convey paper.

Figure 13A:
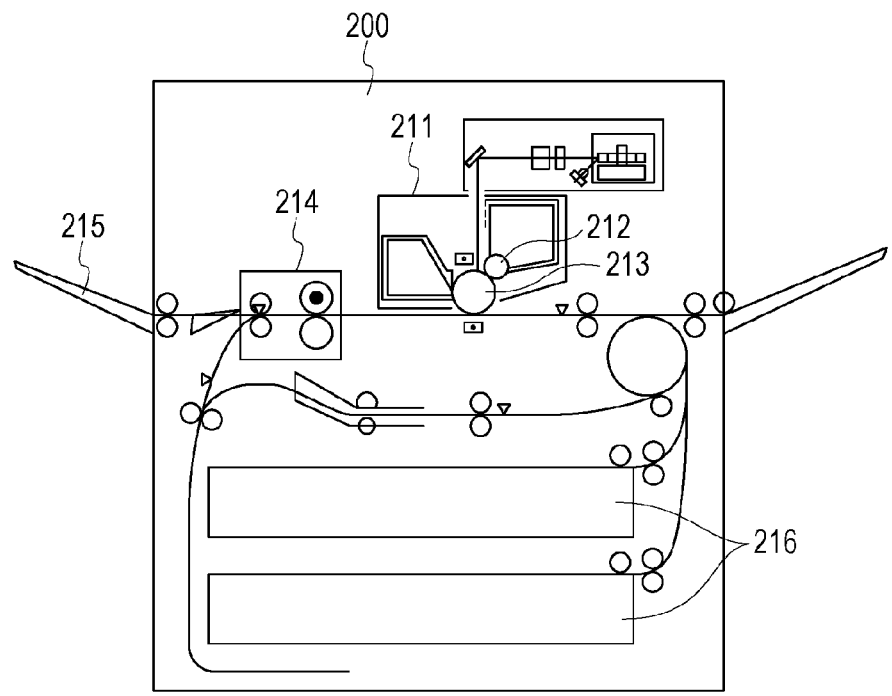
FIGS. 13A and 13B are diagrams illustrating examples of applications of a switching power supply.
Figure 13B:
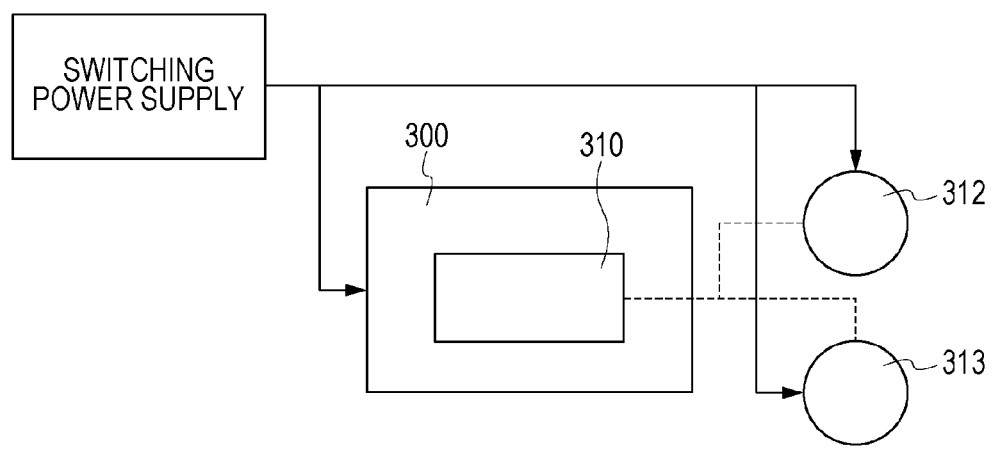

FIG. 13A schematically illustrates a structure of a laser beam printer 200, which is an example of an image forming apparatus. The laser beam printer 200 includes an image forming unit 211 including a photosensitive drum 213 serving as an image bearing member on which a latent image is formed and a developing unit 212 that develops the latent image formed on the photosensitive drum with toner. The developed toner image on the photosensitive drum 213 is transferred to a sheet (not shown) serving as a recording medium supplied from a cassette 216. The toner image transferred to the sheet is then fixed by a fixing unit 214, and the sheet is discharged onto a tray 215. FIG. 13B illustrates a power supply line from a power supply to a controller (control unit) and a motor serving as a driving unit in an image forming apparatus. The above-described switching power supply may be used as a low-voltage power supply for supplying electric power to a controller 300 including a CPU 310 that controls the image forming operation described above, and to a motor 312 and a motor 313 serving as driving units in the image forming operation. The supply voltages are, for example, 3.3 volts to the controller 300 and 24 volts to the motors. For example, the motor 312 drives a conveying roller to convey a sheet, and the motor 313 drives the fixing unit 214. When the switching power supply is used as the low-voltage power supply in the image forming apparatus in the above-described manner, as with the embodiments described above, it is possible to reduce the increase in temperature of the switching element in the low-voltage power supply and supply a stable voltage, and thus it is possible to operate the image forming apparatus in a stable manner. Note that the switching power supply according to one of the embodiments described above may be used not only as the low-voltage power supply in the image forming apparatus and also as a low-voltage power supply of other electronic devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-020140 filed Feb. 1, 2011, which is hereby incorporated by reference herein in its entirety.

What is claimed is:

1. A switching power supply comprising:
    a switching unit configured to drive a primary winding of a transformer;
    an electrical element connected to the switching unit and through which a current flows when the switching unit is driven; and
    an electromotive force reduction unit connected in parallel to the electrical element and configured to reduce an electromotive force generated by the electrical element.

2. The switching power supply according to claim 1, wherein the electromotive force reduction unit is a diode.

3. The switching power supply according to claim 2, wherein a forward voltage of the diode is set to be lower than a threshold voltage needed for the switching unit to turn on.

4. The switching power supply according to claim 1, wherein the electromotive force reduction unit is a capacitor.

5. The switching power supply according to claim 1, wherein the electromotive force reduction unit is a circuit including a capacitor and a resistor connected to each other in series.

6. The switching power supply according to claim 1, wherein the electrical element is a wire wound resistor or a film resistor.

7. An image forming apparatus comprising:
an image forming unit;
a control unit configured to control an operation of the image forming unit; and
a switching power supply configured to supply electric power to the control unit,
the switching power supply comprising
a switching unit configured to drive a primary winding of a transformer;
an electrical element connected to the switching unit and through which a current flows when the switching unit is driven; and
an electromotive force reduction unit connected in parallel to the electrical element and configured to reduce an electromotive force generated by the electrical element.

8. The image forming apparatus according to claim 7, wherein the electromotive force reduction unit is a diode.

9. The image forming apparatus according to claim 8, wherein a forward voltage of the diode is set to be lower than a threshold voltage needed for the switching unit to turn on.

10. The image forming apparatus according to claim 7, wherein the electromotive force reduction unit is a capacitor.

11. The image forming apparatus according to claim 7, wherein the electromotive force reduction unit is a circuit including a capacitor and a resistor connected to each other in series.

12. The image forming apparatus according to claim 7, wherein the electrical element is a wire wound resistor or a film resistor.

* * * * *